(12) United States Patent
Neild

(10) Patent No.: US 12,530,414 B2
(45) Date of Patent: Jan. 20, 2026

(54) CATEGORIZING AND RECOMMENDING CONTENT THROUGH MULTI-DIMENSIONAL EXPLICIT USER FEEDBACK

(71) Applicant: Hanford Fairfax Neild, Bronxville, NY (US)

(72) Inventor: Hanford Fairfax Neild, Bronxville, NY (US)

(*) Notice: Subject to any disclaimer, the term of this patent is extended or adjusted under 35 U.S.C. 154(b) by 7 days.

(21) Appl. No.: 17/468,345

(22) Filed: Sep. 7, 2021

(65) Prior Publication Data

US 2023/0074756 A1 Mar. 9, 2023

(51) Int. Cl.
*G06F 16/9535* (2019.01)
*G06F 3/04817* (2022.01)
*G06F 18/213* (2023.01)
*G06F 18/22* (2023.01)
*G06N 5/04* (2023.01)

(52) U.S. Cl.
CPC ...... *G06F 16/9535* (2019.01); *G06F 3/04817* (2013.01); *G06F 18/213* (2023.01); *G06F 18/22* (2023.01); *G06N 5/04* (2013.01)

(58) Field of Classification Search
CPC .. G06F 16/9535; G06F 3/04817; G06F 18/22; G06F 18/213; G06K 9/6215; G06K 9/6232; G06N 5/04
See application file for complete search history.

(56) References Cited

U.S. PATENT DOCUMENTS

| | | | |
|---|---|---|---|
| 11,375,256 B1* | 6/2022 | Dorner | G06N 3/04 |
| 11,451,870 B1* | 9/2022 | Panchaksharaiah | H04N 21/44226 |
| 2006/0143647 A1* | 6/2006 | Bill | G06F 16/636 707/E17.101 |
| 2011/0179385 A1* | 7/2011 | Li | G06F 16/7867 715/810 |
| 2019/0090020 A1* | 3/2019 | Srivastava | G11B 27/28 |
| 2019/0266617 A1* | 8/2019 | Hwang | G06Q 50/01 |
| 2022/0394001 A1* | 12/2022 | Cundall | H04M 1/7243 |
| 2023/0038347 A1* | 2/2023 | Rajanna | H04N 21/4826 |

* cited by examiner

*Primary Examiner* — Courtney Harmon
(74) *Attorney, Agent, or Firm* — Hamilton, Brook, Smith & Reynolds, P.C.

(57) ABSTRACT

Existing social networks employ implicit and explicit feedback to determine which content to show a user by selecting content designed to maintain the user's attention as long as possible so that more advertisements may be shown between content. To prolong a user's engagement, the content recommendation engine may show content that engages the user through negative emotional states to the detriment of the user's well-being. In an embodiment, a method includes associating (a) a reaction received from a user via a user interface to a unit of content selected by a recommendation engine and presented in the user interface, and (b) a desired display level of the reaction to the user. The reaction is represented by a user-selected icon or a user-selected string. For example, the present system improves social networks by displaying content that elicits the desired emotion of the user, thus empowering the user and enhancing user well-being.

18 Claims, 10 Drawing Sheets

100

150

300

330

500

CATEGORIZING AND RECOMMENDING CONTENT THROUGH MULTI-DIMENSIONAL EXPLICIT USER FEEDBACK

BACKGROUND

Social networks use human connections to share content among many users. As a user's (or users') personal connections on social networks grow, social networks determine which content to deliver to each user, and in what order to deliver it.

SUMMARY

Existing social networks employ feedback, both implicit (i.e., watch time, mouse movement) and explicit (i.e., like, dislike) to determine which content to show a user, where the determination of which content to show the user is designed to maintain the user's attention as long as possible so that more advertisements may be shown between content. To prolong user attention, the content recommendation engine may show content that engages the user by eliciting negative emotions, that are ultimately detrimental to the user's well-being. For example, the displayed content may induce unwanted feelings of fear of missing out (FOMO), anger, regret, sadness, loneliness, insecurity, vanity, or shame. The user has a limited ability to explicitly influence the content recommendation engine to prevent unhealthy yet engaging content from appearing.

In an embodiment, a method includes associating (a) a reaction received from a first user via a user interface to a first unit of content selected by a recommendation engine and presented in the user interface, and (b) a desired display level of the reaction to the user. The reaction is represented by at least one of a user-selected icon and a user selected string.

In some embodiments, the method includes determining, at the recommendation engine, a second unit of content based on the reaction and the desired display level of the reaction to the first user. The method further includes returning the second unit of content determined by the recommendation engine.

In some embodiments, the method further includes receiving the desired display level of the reaction during the same user interaction as receiving the reaction.

In some embodiments, the method includes uploading a custom icon by an uploading user.

In some embodiments, associating the reaction further includes associating a plurality of reactions to respective units of content and associating the user with multiple desired display levels of the reactions. In other words, multiple reactions can be associated to multiple units of content for both the system as a whole and for each user.

In some embodiments, the method can further include determining, at the recommendation engine, the second unit of content to display at the user interface based on at least one mood of the user. The at least one mood includes the plurality of desired display levels of each respective reaction.

In an embodiment, the at least one mood can be chosen by the user, selected based on a window of time, and/or selected based on recency of being chosen by the user.

In some embodiments, the method can include correlating the reactions from at least one user and multiple users to the multiple units of content to generate a probability that each content elicits a given reaction by other users.

In some embodiments, the method can further include loading multiple reactions received from other users to the unit of content, normalizing the reaction of the user to the multiple reactions from other users by generating a normalized reaction vector; and determining the second unit of content by comparing the normalized reaction vector to a database of content, and selecting a unit of content from the database having a reaction vector most similar to the normalized reaction vector. In some embodiments, a user can be associated with a plurality of moods, and the method further includes normalizing the reaction of the user to the multiple reactions from other users by generating a plurality of normalized reaction vectors corresponding to each mood.

In some embodiments, the recommendation engine selects the first unit of content by at least one of determining content that fits a profile of a user, determining content that fits a generic user profile, determining content that fits a generic demographic user profile, and determining content at random.

In some embodiments, the recommendation engine determines the second unit of content based on reactions of other users.

In some embodiments, the method includes displaying the second unit of content in at least one of the user interface and a second user interface.

In an embodiment, a system includes a processor and a memory. The memory is configured with computer code instructions stored thereon. The processor and the memory, with the computer code instructions, are configured to cause the system to associate (a) a reaction received from a first user via a user interface to a first unit of content selected by a recommendation engine and presented in the user interface, and (b) a desired display level of the reaction to the user. The reaction is represented by at least one of a user-selected icon and a user selected string. The instructions are further configured to cause the system to determine, at the recommendation engine, a second unit of content based on the reaction and the desired display level of the reaction to the first user. The instructions are further configured to return the second unit of content determined by the recommendation engine.

In some embodiment, the processor is further configured to receive the desired display level of the reaction during the same user interaction as receiving the reaction.

In some embodiments, the processor is further configured to upload a custom icon by an uploading user.

In some embodiments, associating the reaction further includes associating a plurality of reactions to respective units of content of a plurality of units of content and associating a plurality of desired display levels of the reaction to the user. In some embodiments, the processor is further configured to determine, at the recommendation engine, the second unit of content to display at the user interface based on at least one mood of the user, the at least one mood including the plurality of desired display levels of each respective reaction. In some embodiments, the processor is further configured to correlate the plurality of reactions from at least one of the user and a plurality of users to the plurality of units of content to generate a probability that each content elicits a given reaction by other users. In some embodiments, the mood is chosen by the user, selected based on a window of time, and/or selected based on recency of being chosen by the user. In other words, multiple reactions can be associated to multiple units of content for both the system as a whole and per each user. In some embodiments, the processor is further configured to load a plurality of reactions received from other users to the unit of content, normalize the reaction of the user to the plurality of reactions from other users by generating a normalized reaction vector, and determine the second unit of content by comparing the normalized reaction vector to a database of content, and selecting a unit of content from the database having a reaction vector most similar to the normalized reaction vector. In some embodiments, a user can be associated with a plurality of moods, and the processor is further configured to normalize the reaction of the user to the plurality of reactions from other users by generating a plurality of normalized reaction vectors corresponding to each mood.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
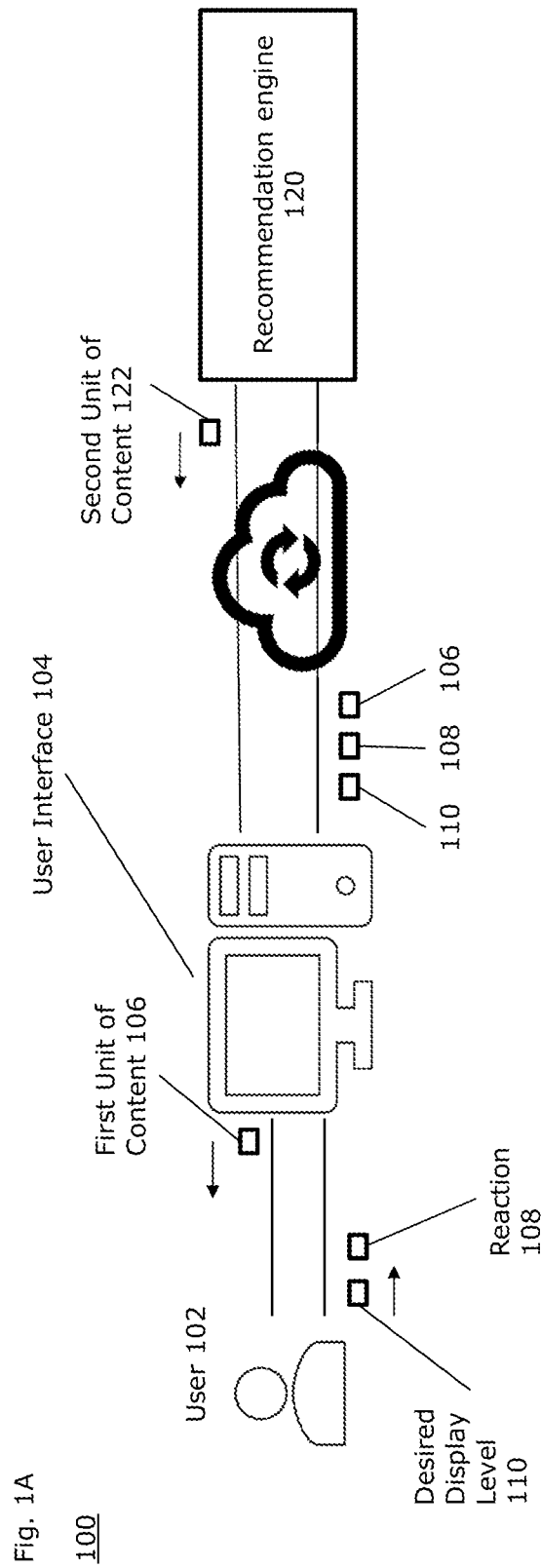
FIG. 1A is a block diagram illustrating an example embodiment of a system in the present disclosure.

A description of example embodiments follows.

Current social media platforms present content to users using recommendation engines that present content to the user similar to previous content the user has engaged with. These recommendation engines are designed to keep each user engaged in the network by recommending content that keeps the user's attention for as long as possible. In these networks, therefore, the user has limited control over the type of emotion their recommended content elicits at any point in time. Current networks limit the user's ability to quickly customize the network's recommendations.

The present disclosure presents a method and corresponding system to solve the above problems. In embodiments, the user can engage with content with limitless amount of reactions (e.g., via emojis or custom emojis). In addition, the user can pair each reaction with a desired display level. In doing so, the user can explicitly influence the engine to find content that elicits the desired reactions, while avoiding content that elicits unwanted reactions. Furthermore, the user can group and save the desired reaction levels into one or more "moods," so that the user can quickly change the type of feelings they would like the engine to elicit. Each of the one or more moods generates a score for each piece of content based on the reaction(s)/hyroji(s)] the mood indicates should be elicited in/for the user, as opposed to maximizing the user's time looking at the social network.

In addition, existing search engines primarily use strings in a search bar, combined with contextual data such as location/geography or time, to produce a relatively small number of results from a large corpus of data that are responsive to the string(s), and optionally location or time. Existing search engines employ web scraping to collect web content and categorize the pages into an index that can be quickly queried by strings or images.

In an embodiment of the present disclosure, a system and method employ a novel search parameter: a mood, defined as a plurality of desired display levels of reactions for the given user. The goal of this embodiment is to provide a search engine that returns, to the user, content that elicits those desired emotions while avoiding eliciting reactions with a negative or low desired display level. This new type of search engine can be called a multi-sentiment search engine. Unlike the web scrapers used to determine the page's content and subsequently create indices in typical search engines, the multi-sentiment search engine employs multi-sentiment consensus categorization, among other techniques. In other words, using a consensus of other users' reactions to content, constructed indices enable quick searching of content to match the desired mood of this given user.

A piece of content can receive many, possibly opposing, reactions from a group of users because not all users will have the same reaction to a particular piece of content. Therefore, the engine returns personalized results using multi-sentiment consensus categorization and other forms of context, such as geography, reaction history, similar users' behavior, time, and other data available to the engine. For example, the engine can return different results to different people by estimating which sentiment the content will elicit for the given user making the search based on the above factors.

While the below system and methods are described in relation to a social network, it can be understood that they can be applied to a search engine as described above.

FIG. 1A is a block diagram 100 illustrating an example embodiment of a system in the present disclosure. A user 102 is delivered a first unit of content 106 via a user interface 104. A person having ordinary skill in the art can recognize that a unit of content can be an image, audiovisual media (e.g., video, audio), text, ornamental display of text, blog post, link, link with preview, link to a profile of another user, tweet, Facebook® post, Instagram® post, Snapchat® post, TikTok® Post, or etc. In response, the user 102 can react to the first unit of content 106 with a desired reaction 108 and a desired display level 110. A person having ordinary skill in the art can recognize that desired reaction 108 can arrive before, simultaneously with, or after the desired display level 110. The reaction 108 is in the form of a graphical icon such as an emoji. For example, if the user 102 finds the content funny, the user 102 can select a laughing emoji as the reaction 108. If the user finds the content sad, the user 102 can select a sad emoji as the reaction 108. If the user finds the content infuriating, the user 102 can select an angry emoji as the reaction 108. A person having ordinary skill in the art can recognize that any standard or custom emoji or graphical representation can categorize user's reactions 108 to posts.

The user can also select a desired display level 110 along with the user's reaction 108. The user need not interact with reaction 108 to content 106 for selecting the desired display level 110 to occur. The desired display level 110 can be attached to any reaction 108, including reactions the user has reacted with before and reactions that the user has not reacted with before. The desired display level 110 represents how often the user would like to see content that elicits that particular reaction 108. A recommendation engine 120 receives the content 106 (e.g., via the cloud/internet/local network), reaction 108, and desired display level 110 and adjusts a profile of the user (not shown) by recording that the user had the reaction 108 to the content 106 and that the user would like to see the level 110 of types of content deemed to elicit the reaction 108. With the updated user profile (not shown), the recommendation engine 120 selects a second unit of content 122 from the network to present to the user 102 at the user interface 104. The selected second unit of content 122 is determined based on at least one desired display level 110 of the user and the reaction 108. In some embodiments, other factors such as reactions of other users, analysis of the units of contents themselves including the second unit of content 122, the desired display level of reactions of other users, and the current user's previous reactions can be part of selecting the second unit of content 122.

Figure 1B:
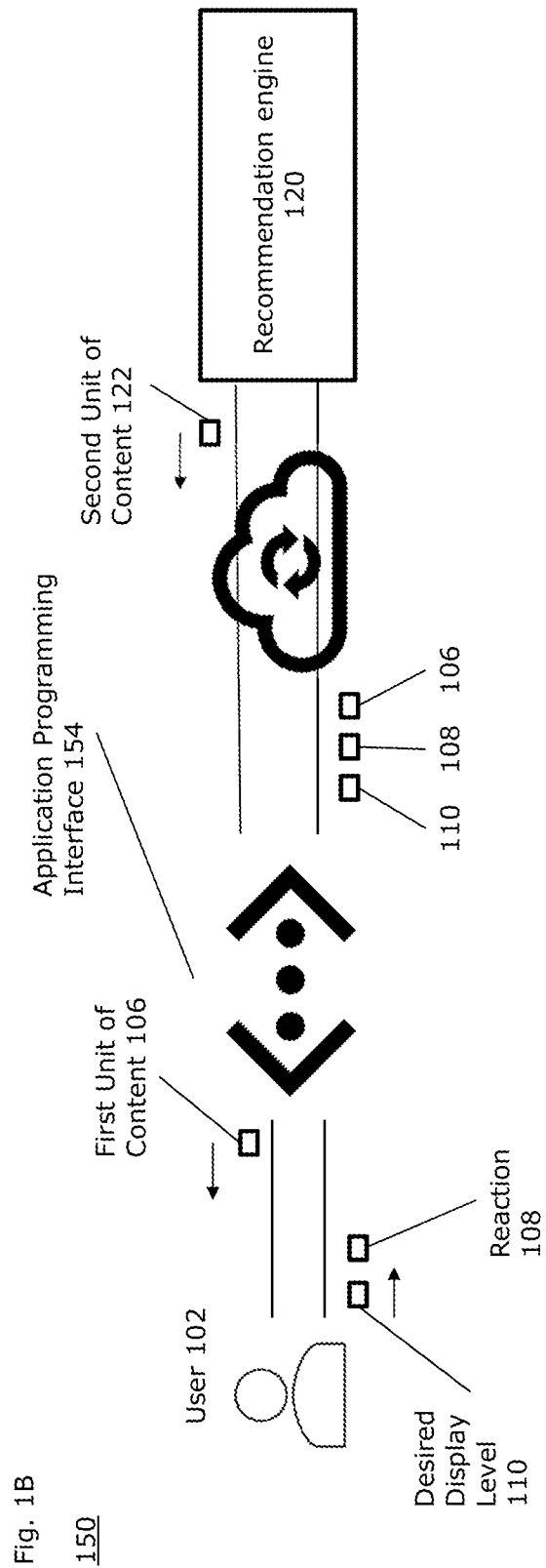
FIG. 1B is a diagram illustrating an example embodiment of a method employed by the present disclosure.

FIG. 1B is a diagram 150 illustrating an example embodiment of a method employed by the present disclosure. A user 102 is delivered a first unit of content 106 via a application programming interface 154. A person having ordinary skill in the art can recognize that the user 102 can also be a third-party application or application interface/application programming interface, in some embodiments. A person having ordinary skill in the art can recognize that a unit of content can be an image, audiovisual media (e.g., video, audio), text, ornamental display of text, blog post, link, link with preview, link to a profile of another user, tweet, Facebook® post, Instagram® post, Snapchat® post, Tik-Tok® Post, or etc. In response, the user 102 can react to the first unit of content 106 with a desired reaction 108 and a desired display level 110. The reaction 108 is in the form of a graphical icon such as an emoji. For example, if the user 102 finds the content funny, the user 102 can select a laughing emoji as the reaction 108. If the user finds the content sad, the user 102 can select a sad emoji as the reaction 108. If the user finds the content infuriating, the user 102 can select an angry emoji as the reaction 108. A person having ordinary skill in the art can recognize that any standard or custom emoji or graphical representation can categorize user's reactions 108 to posts.

The user can also select a desired display level 110 along with the user's reaction 108. The user need not interact with reaction 108 to content 106 for selecting the desired display level 110 to occur. The desired display level 110 can be attached to any reaction 108, including reactions the user has reacted with before and reactions that the user has not reacted with before. The desired display level 110 represents how often the user would like to see content that is categorized with that particular reaction 108. A recommendation engine 120 receives the content 106 (e.g., via the cloud/internet/local network), reaction 108, and desired display level 110 and adjusts a profile of the user (not shown) by recording that the user had the reaction 108 to the content 106 and that the user would like to see the level 110 of types of content deemed to elicit the reaction 108. With the updated user profile (not shown), the recommendation engine 120 selects a second unit of content 122 from the network to present to the user 102 at the application programming interface 154. The selected second unit of content 122 is determined based on at least one desired display level 110 of the user and the reaction 108. In some embodiments, other factors such as reactions of other users, analysis of the units of contents themselves including the second unit of content 122, the desired display level of reactions of other users, and the current user's previous reactions can be part of selecting the second unit of content 122.

In embodiments, the method and system described above utilizes various vectors to generate the respective moods. The vectors include a content vector, content-user vector, and user vector.

The content vector represents the reactions that a piece of content is likely to elicit (e.g., Content 106 has a vector of [sad: 0, funny 0.5, happy: 1.0, . . . ]). The content vector can be derived from any of the following:
  a) all of the reactions that other users have given Content 106;
  b) an analysis of the content itself;

The content-user vector represents the reactions that a piece of content is likely to elicit for a given user (e.g., Content has a vector of [sad: 0, funny 0.5, happy: 1.0, . . . ] for User 102). It can be derived from any of the following:
  a) the content vector described above.
  b) User 102 reactions to other content The user vector represents the reactions that a given user would like the engine to elicit. (e.g., User 102 would like to feel [sad: 0.2, funny, 1.0, happy: 0.0, . . . ]). It can be derived from any of the following:
  a) User 102's mood (e.g., an explicitly desired mood, comprised of a plurality of desired display levels of reactions);
  b) User 102's previous reactions to content;
  c) The time of day;
  d) An implicit current mood of this user (e.g., after a detection that user is anxious, implicitly changing the mood to calming, optionally even more so than their explicit desired mood claims they desire)
  e) An implicit desired future mood of this user (e.g., user says they want to feel one way in (a), but the engine guides them to this mood)
  f) The content previously shown to the user (e.g., too much content eliciting another mood was shown, so other content is shown to counter-act the previous content)
  g) Previous iterations of the vector currently being described (They felt this vector yesterday, can that inform their current vector).

The second unit of content can be selected by comparing the user-content vector (2) and the user vector (3). In one embodiment, a most similar vector is determined to select the second unit of content. In some embodiments, however, metrics other than finding the most similar vector can be employed in order to guide the user to the appropriate unit of content based on the user's mood. Machine learning methods employing neural networks, or other metrics, can compare the user-content vector and the user vector and find the unit of content yielding the highest score.

Figure 2A:
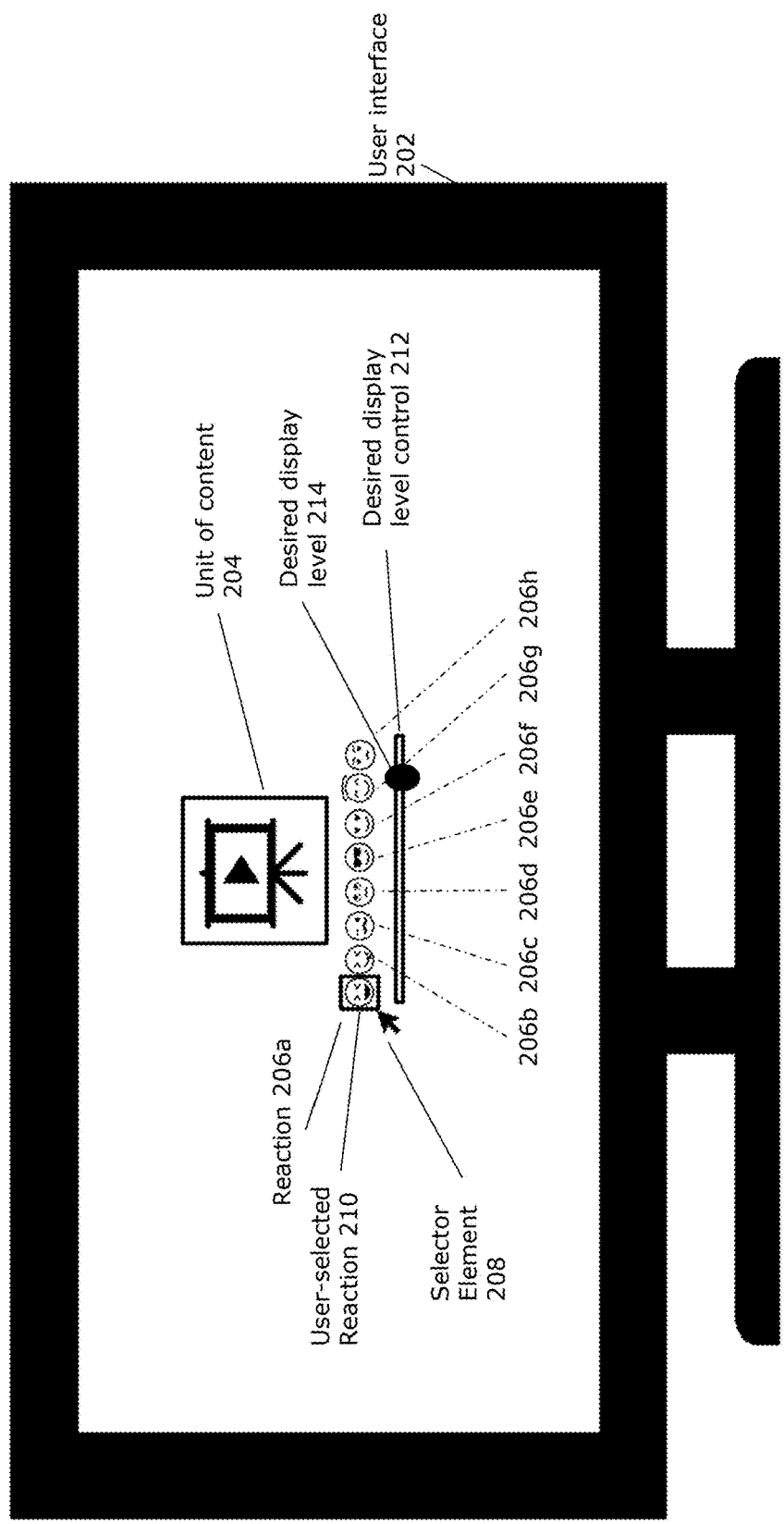
FIG. 2A is a diagram illustrating an example embodiment of a user interface employed by the present disclosure.

FIG. 2A is a diagram 200 illustrating an example embodiment of a user interface 202 employed by the present disclosure. The user interface 202 presents a unit of content 204 with a plurality of reactions 206a-h. The plurality of reactions 206a-h can be a fixed set of reactions in some embodiments (e.g., a default set of reactions) but can also dynamically change based on a user's profile, mood, time of day, trending reactions, or an analysis of the unit of content 204. A person having ordinary skill in the art can recognize that the reaction 206a-h can be emojis, other graphics, or other representations of a reaction. The user can select a user-selected reaction 210, 206a of the reactions 206a-h with a selector element 208 (e.g., mouse cursor, touch screen). Once selected, the user can adjust a desired display level control 212 to select a desired display level 214. In addition, the adjustment of the desired display level 214 can occur at any point in time, before the content has been seen or after and may appear in a different user-interface, such as a mood adjustment screen (not shown). The desired display level 214 indicates how often the user wishes to see content having the user-selected reaction 210.

Figure 2B:
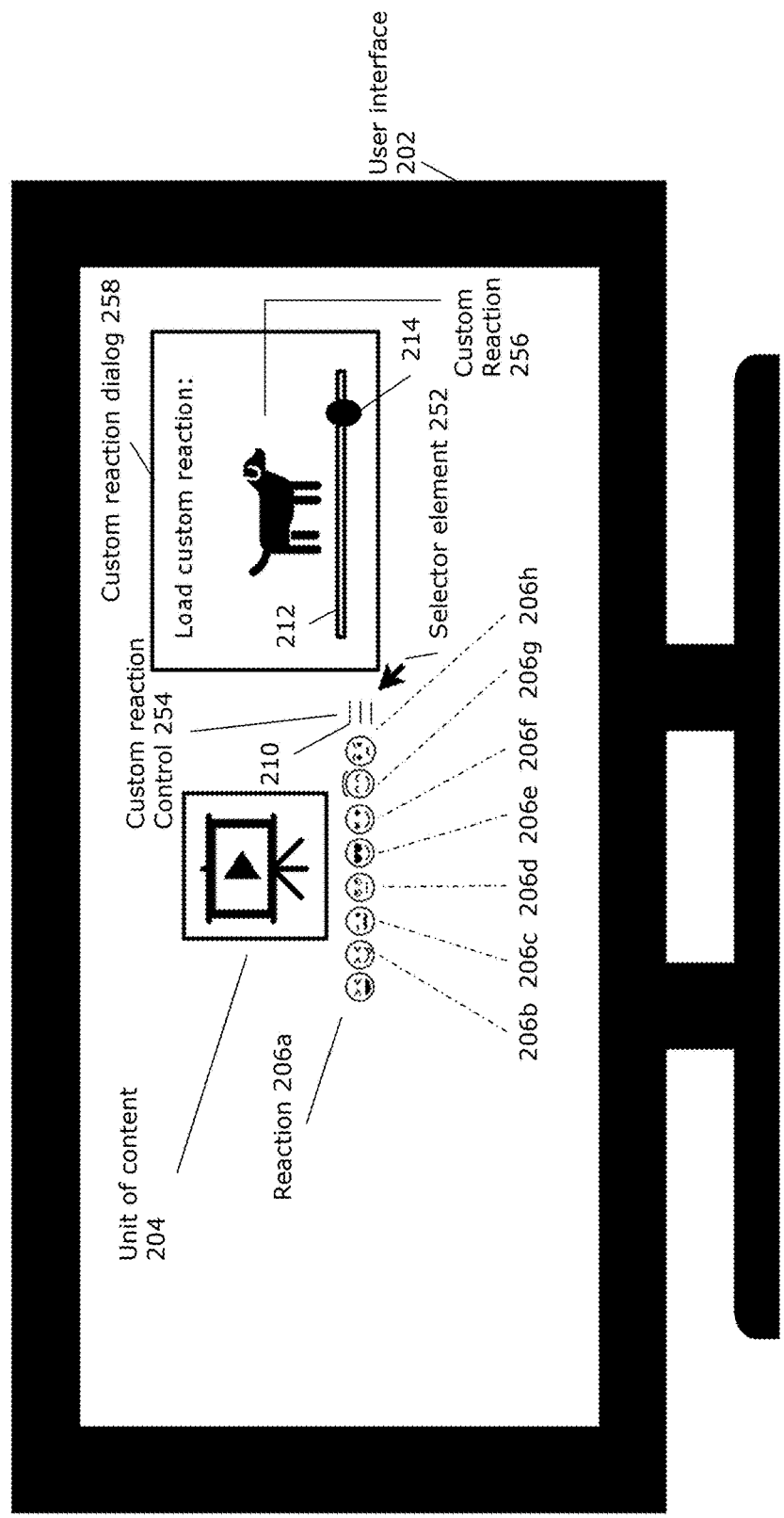
FIG. 2B is a diagram illustrating an example embodiment of a user interface employed by the present disclosure.

FIG. 2B is a diagram 250 illustrating an example embodiment of a user interface 202 employed by the present disclosure. The user interface 202 presents a unit of content 204 with a plurality of reactions 206a-h. A person having ordinary skill in the art can recognize that the reaction 206a-h can be emojis, other graphics, or other representations of a reaction. The user can select a user selected reaction 210 of the reactions 206a-h with a selector element 208 (e.g., mouse cursor, touch screen).

In this embodiment, the user selected reaction 210 is a custom reaction control 254. Selecting the custom reaction control 254 enables a custom reaction dialog 258 that allows the user to load a custom reaction. Loading a custom reaction can be performed by the user loading a custom image file, a custom animated file, a custom audiovisual file, a custom multimedia file, a custom audio file, or a library of reactions. In this case, the user uploads a custom reaction 256 of a dog. Once uploaded and selected, the user can adjust the desired display level control 212 to indicated a desired display level 214. A person having ordinary skill in the art can recognize that (A) uploading a new reaction and (B) setting the desired display level need not occur at the time the content 204 is seen, and can occur at different times. A and B can also occur at different times themselves.

Figure 3A:
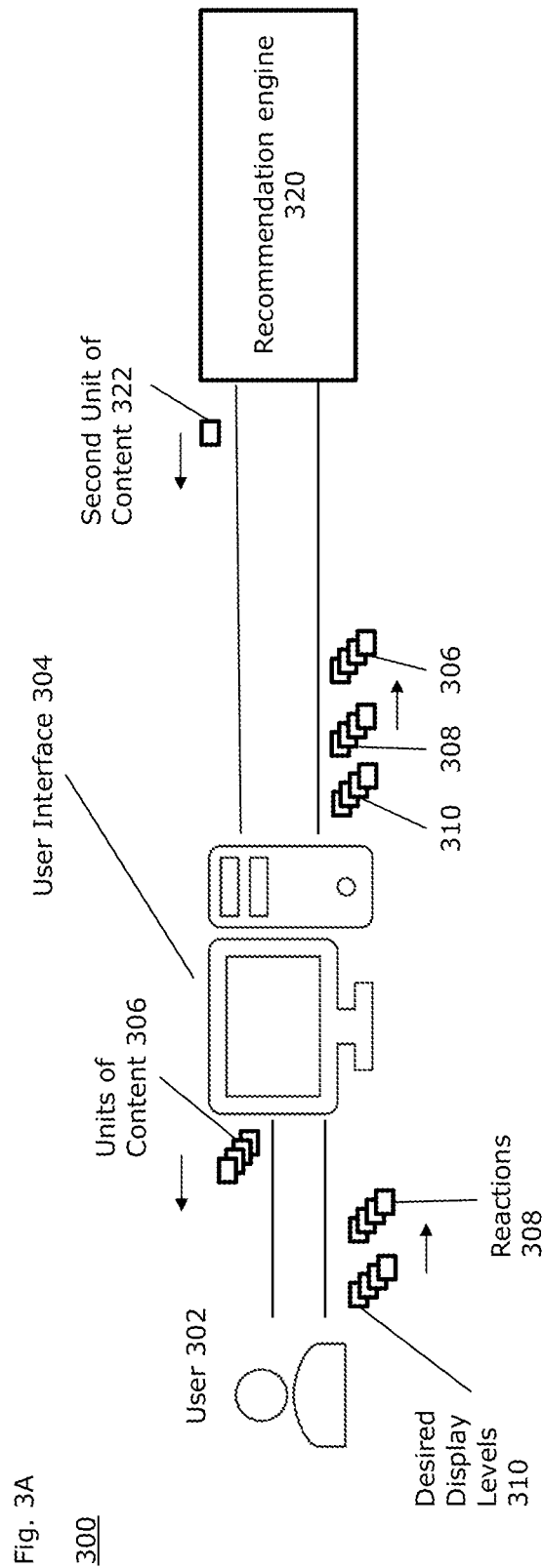
FIG. 3A is a block diagram illustrating an example embodiment of a system in the present disclosure.

FIG. 3A is a block diagram 300 illustrating an example embodiment of a system in the present disclosure. A user 302 is delivered units of content 306 via a user interface 304. A person having ordinary skill in the art can recognize that a unit of content can be an image, audiovisual media (e.g., video, audio), text, ornamental display of text, blog post, link, link with preview, link to a profile of another user, tweet, Facebook® post, Instagram® post, Snapchat® post, TikTok® Post, or etc. In response, the user 302 can react to the units of content 306 with respective desired reactions 308 corresponding to each unit of content 306 and a desired display level 310. A person having ordinary skill in the art can recognize each desired reaction 308 can arrive before, simultaneously with, or after the desired display level 310. Each reaction 308 is in the form of a graphical icon such as an emoji. For example, if the user 302 finds the content funny, the user 302 can select a laughing emoji as the reaction 308 to that piece of content. If the user finds the content sad, the user 302 can select a sad emoji as the reaction 308 to that piece of content. If the user finds the content infuriating, the user 302 can select an angry emoji as the reaction 308 to that piece of content. A person having ordinary skill in the art can recognize that any standard or custom emoji or graphical representation can categorize user's reactions 308 to posts.

The user can also select a desired display level 310 for each of the user's reaction 308. The user need not interact with reaction 108 to content 106 for selecting the desired display level 110 to occur. The desired display level 110 can be attached to any reaction 108, including reactions the user has reacted with before and reactions that the user has not reacted with before. The desired display level 310 represents how often the user would like to see the piece of content that is categorized with that particular reaction 308. A recommendation engine 320 receives the units of content 306 (e.g., via the cloud/internet/local network), reactions 308, and desired display levels 310 and adjusts a profile of the user (not shown) by recording that the user had the reactions 308 to the contents 306 and that the user would like to see the desired display levels 310 of types of content deemed to elicit the reactions 308. With the updated user profile (not shown), the recommendation engine 320 selects a second unit of content 322 from the network to present to the user 302 at the user interface 304. The selected second unit of content 322 is determined based on at least one desired display level 310 of the user and the reaction 308.

Figure 3B:
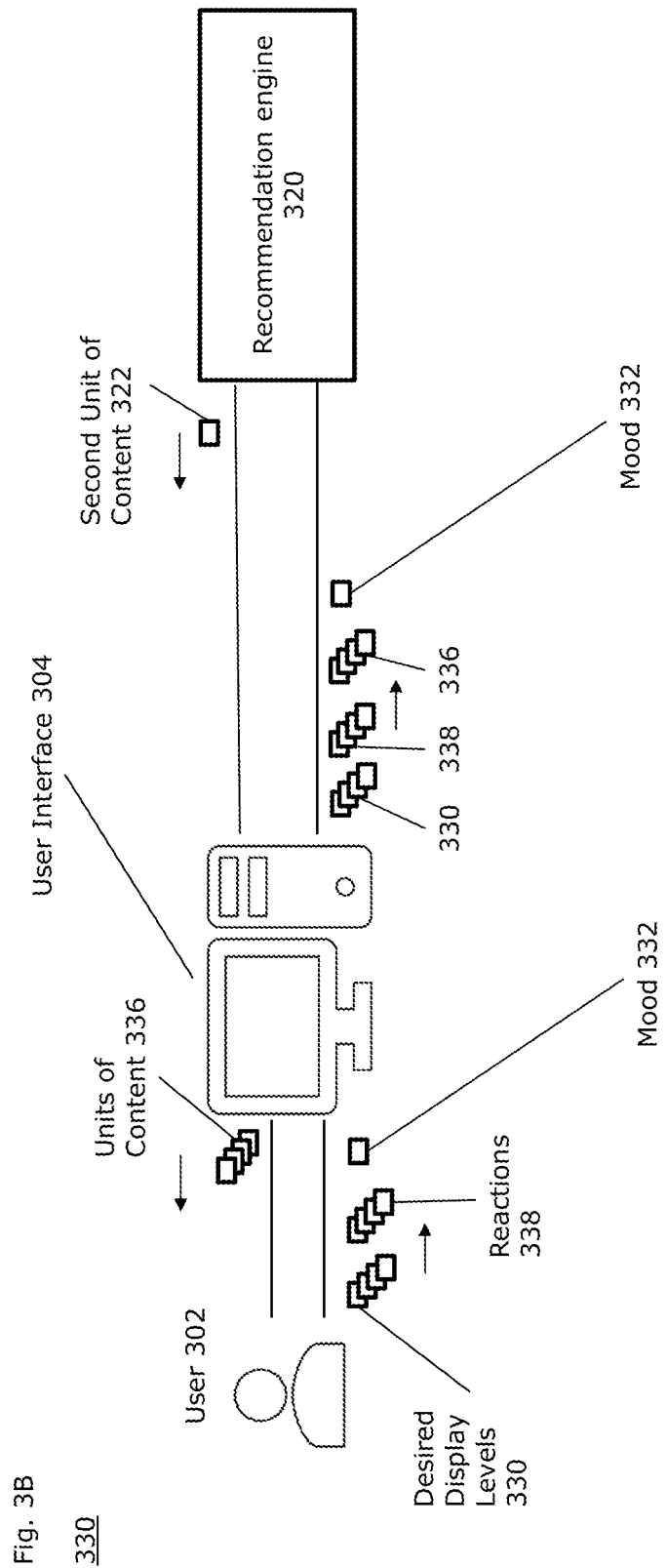
FIG. 3B is a block diagram illustrating an example embodiment of a system in the present disclosure.

FIG. 3B is a block diagram 300 illustrating an example embodiment of a system in the present disclosure. A user 302 is delivered units of content 306 via a user interface 304. A person having ordinary skill in the art can recognize that a unit of content can be an image, audiovisual media (e.g., video, audio), text, ornamental display of text, blog post, link, link with preview, link to a profile of another user, tweet, Facebook® post, Instagram® post, Snapchat® post, TikTok® Post, or etc. In response, the user 302 can react to the units of content 306 with respective desired reactions 308 corresponding to each unit of content 306 and a desired display level 310. Each reaction 308 is in the form of a graphical icon such as an emoji. For example, if the user 302 finds the content funny, the user 302 can select a laughing emoji as the reaction 308 to that piece of content. If the user finds the content sad, the user 302 can select a sad emoji as the reaction 308 to that piece of content. If the user finds the content infuriating, the user 302 can select an angry emoji as the reaction 308 to that piece of content. A person having ordinary skill in the art can recognize that any standard or custom emoji or graphical representation can categorize user's reactions 308 to posts.

The user can also select a desired display level 310 for each of the user's reaction 308. The user need not interact with reaction 308 to content 306 for selecting the desired display level 310 to occur. The desired display level 310 can be attached to any reaction 308, including reactions the user has reacted with before and reactions that the user has not reacted with before. The desired display level 310 represents how often the user would like to see the piece of content that is categorized with that particular reaction 308. The user can further generate or edit a mood 332 that includes at least one reaction to at least, at least one desired display level in response to at least one piece of content. The user can also select a mood 332 for the social network to use in its engine at any point in time. A mood includes at least one reaction with at least one desired display level. A mood can be selected to quickly change the user's desired display levels. The mood 332 can act as a quick and explicit mechanism for influencing the content for the user 302. The user 302 can set up any number of moods 332. Each mood can further include rules on when it should be enacted by the recommendation engine, such as a time-based rule (e.g., run the selected mood from 9 am-5 pm), a location-based rule (e.g., run the mood when the user is at home, at work, at the store, etc.), a sentimentality based rule (e.g., run a particular mood when an analysis of the social network's posts for a time period are negative).

Figure 4:
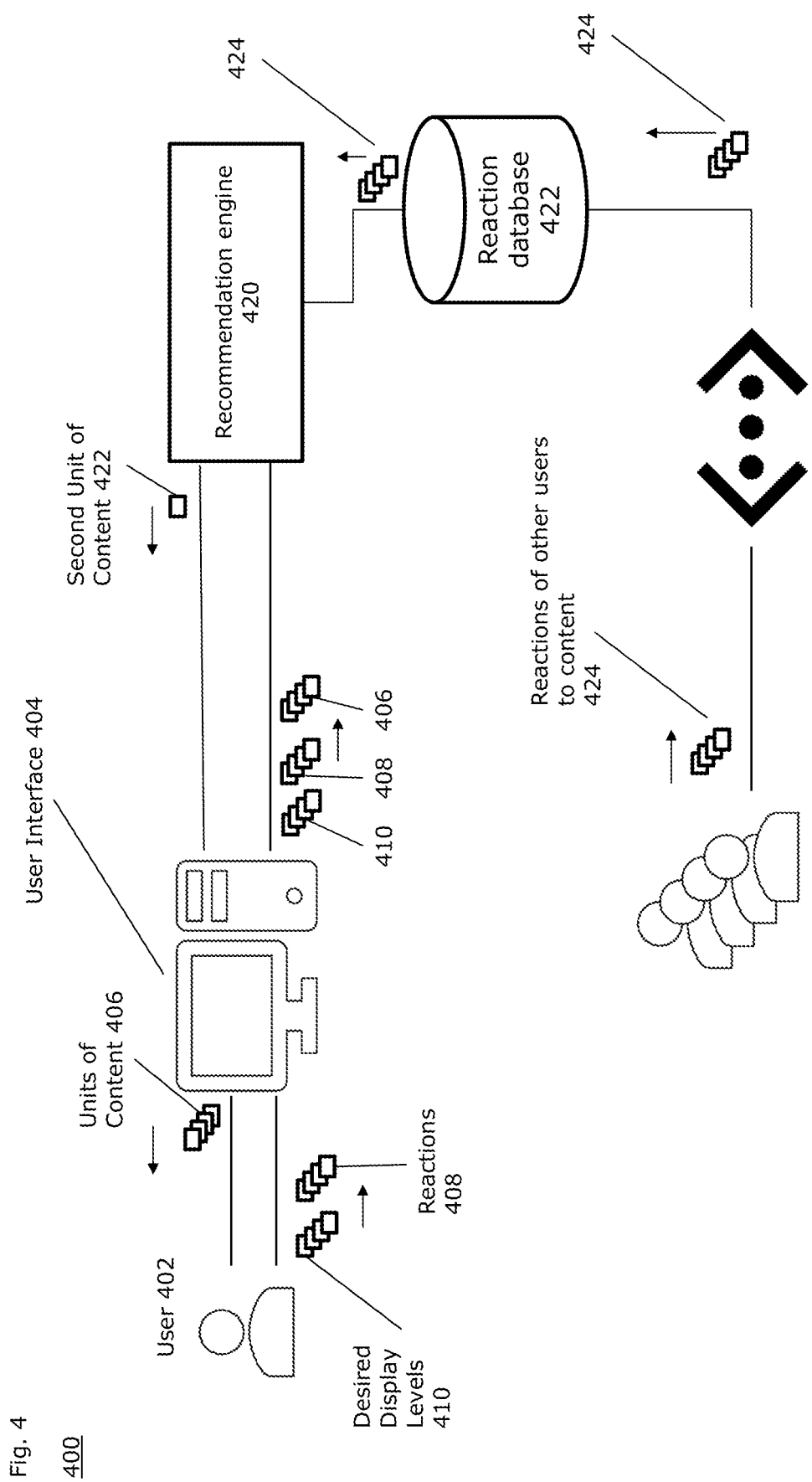
FIG. 4 is a block diagram illustrating an example embodiment of a system in the present disclosure.

FIG. 4 is a block diagram 400 illustrating an example embodiment of a system in the present disclosure. A user 402 is delivered units of content 406 via a user interface 404. A person having ordinary skill in the art can recognize that a unit of content can be an image, audiovisual media (e.g., video, audio, music, songs, etc.), text, ornamental display of text, blog post, link, link with preview, link to a profile of another user, tweet, Facebook® post, Instagram® post, Snapchat® post, TikTok® Post, or etc. In response, the user 402 can react to the units of content 406 with respective desired reactions 408 corresponding to each unit of content 406 and a desired display level 410. Each reaction 408 is in the form of a graphical icon such as an emoji. For example, if the user 402 finds the content funny, the user 402 can select a laughing emoji as the reaction 408 to that piece of content. If the user finds the content sad, the user 402 can select a sad emoji as the reaction 408 to that piece of content. If the user finds the content infuriating, the user 402 can select an angry emoji as the reaction 408 to that piece of content. A person having ordinary skill in the art can recognize that any standard or custom emoji or graphical representation can categorize user's reactions 408 to posts.

In addition, in the case of audiovisual content, or any content having a time component, the system can record the timestamp that the reaction was recorded. In addition, multiple reactions can be recorded at multiple timestamps. The recommendation engine can then learn, from the reaction(s) with timestamps, which parts of the content cause various emotions. This added granularity can help the recommendation engine learn more specifically about what portions of audiovisual content cause various reactions, and provide more information than binary like, share, or next video buttons.

The user can also select a desired display level 410 for each of the user's reaction 408. The user need not react with user's reaction 408 to content 406 in order for selecting the desired display level 410 to occur. The desired display level 410 can be attached to any reaction 408, including reactions the user has reacted with before and reactions that the user has not reacted with before. The desired display level 410 represents how often the user would like to see content that elicits that particular reaction 408. A recommendation engine 420 receives the units of content 406 (e.g., via the cloud/internet/local network), reactions 408, and desired display levels 410 and adjusts a profile of the user (not shown) by recording that the user had the reactions 408 to the contents 406 and that the user would like to see the desired display levels 410 of types of content deemed to elicit the reactions 408. With the updated user profile (not shown), the recommendation engine 420 selects a second/subsequent unit of content 422 from the network to present to the user 402 at the user interface 404. In embodiments, the user profile can take time to update, an exact second unit of content may not take the previous reaction into account. The recommendation engine can employ a combination of streaming updates (e.g., in or close to real time) and batch updates (e.g., slower, or regularly scheduled) to influence the recommendation. Therefore, a person having ordinary skill in the art can recognize that the second unit of content is not necessarily the unit of content displayed immediately after the first unit of content, and therefore can also be referred to in some embodiments as a subsequent unit of content. In some embodiments, the selected second unit of content 422 can be determined based on at least one desired display level 410 of the user and the reaction 408.

A recommendation engine 420 receives the units of content 406 (e.g., via the cloud/internet/local network), reactions 408, and desired display levels 410 and adjusts a profile of the user (not shown) by recording that the user had the reactions 408 to the contents 406 and that the user would like to see the desired display levels 410 of types of content deemed to elicit the reactions 408. With the updated user profile (not shown), the recommendation engine 420 selects a second unit of content 422 from the network to present to the user 402 at the user interface 404. The selected second unit of content 422 is determined based on at least one desired display level 410 of the user and the reaction 408.

In addition, reactions of other users to content 424 are received from a plurality of other users of the social network by an application programming interface and processed accordingly. The recommendation engine 420 determines which units of content from each users is displayed to every user on the network, and in which order. In other words, two users with an exact same social connection list may be presented different content based on how they react to content and adjust their desired display levels. Each reaction 424 are stored in a reaction database 422, and the recommendation engine 420 can access the reactions 424 to determine which content to recommend to the user 402. A person having ordinary skill in the art can recognize that the recommendation engine 420 can further recommend non-private content to any user on the network. In some embodiments, while the recommended content is non-private content, the engine can analyze private content to improve its recommended content predictions, even if the private content is not displayed to unauthorized users.

Figure 5:
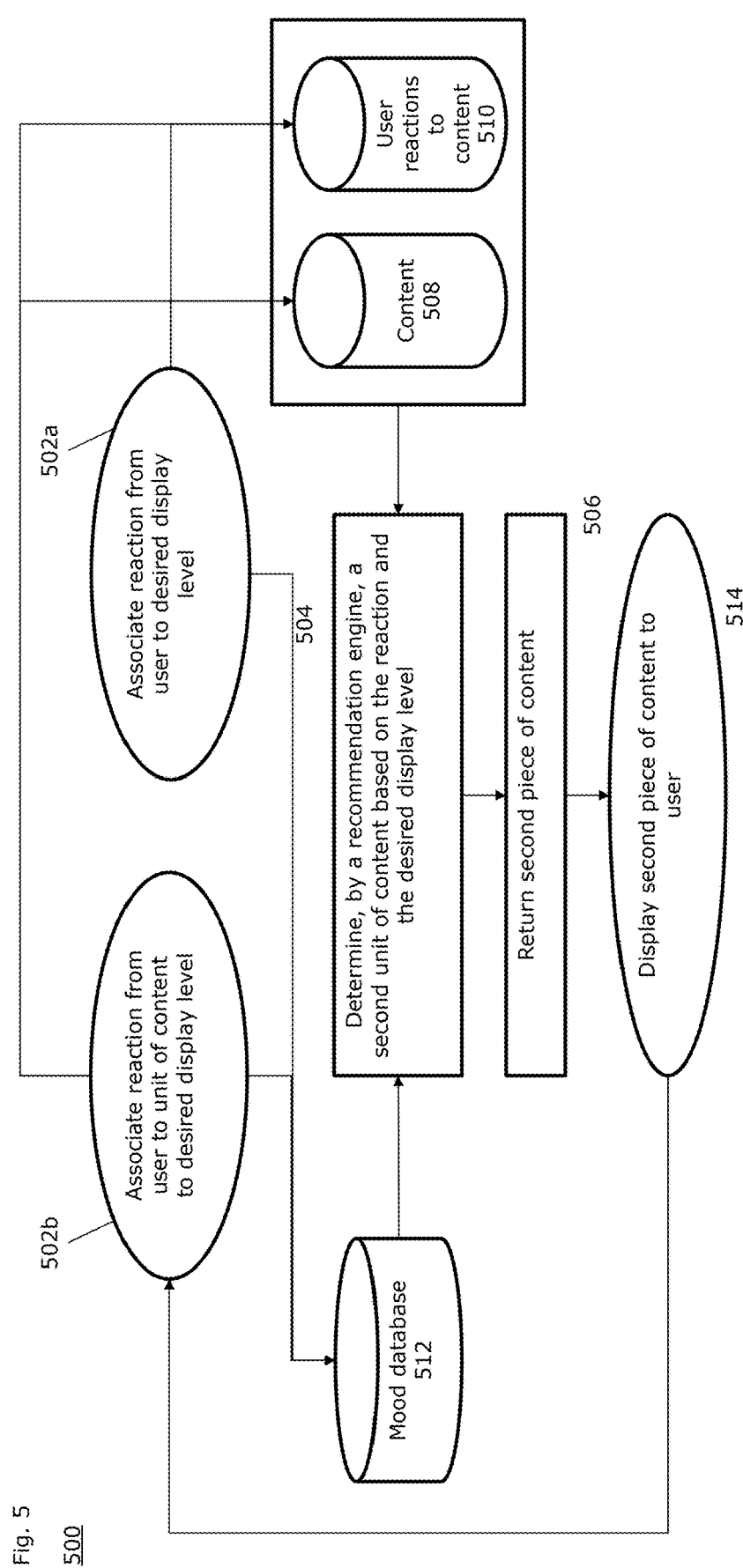
FIG. 5 is a flow diagram illustrating an example embodiment of the present disclosure.

FIG. 5 is a flow diagram 500 illustrating an example embodiment of the present disclosure. The method begins associating a reaction from a user to a desired display level (502a). Optionally, the reaction from the user can be to a unit of content (502b). The reaction is recorded in a mood database 512 corresponding to a user's profile and further associated with the content 508 in a user reaction to content database 510. A person having ordinary skill in the art can recognize that other numbers of databases can be used where the content reacted to is associated to each reaction to it by the users of the network.

The method then determines, by a recommendation engine, a second unit of content based on the reaction and the desired display level (504). The method then returns the second piece of content (506) and displays the second piece of content to the user (514). Then the method optionally associates a reaction from the user to the second unit of content to a desired display level (502b).

A person having ordinary skill in the art can further recognize that the above method can be performed without displaying the piece of content where the content is instead stored.

Figure 6:
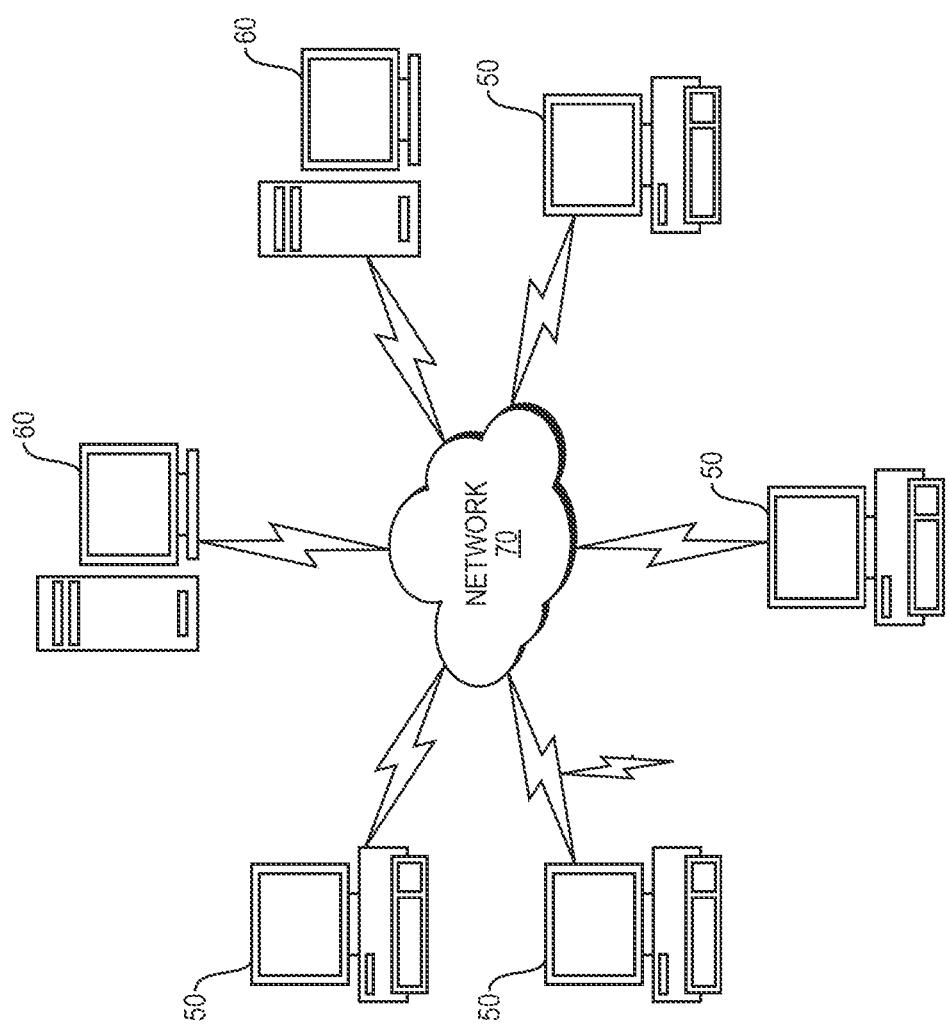
FIG. 6 illustrates a computer network or similar digital processing environment in which embodiments of the present invention may be implemented.

FIG. 6 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 7:
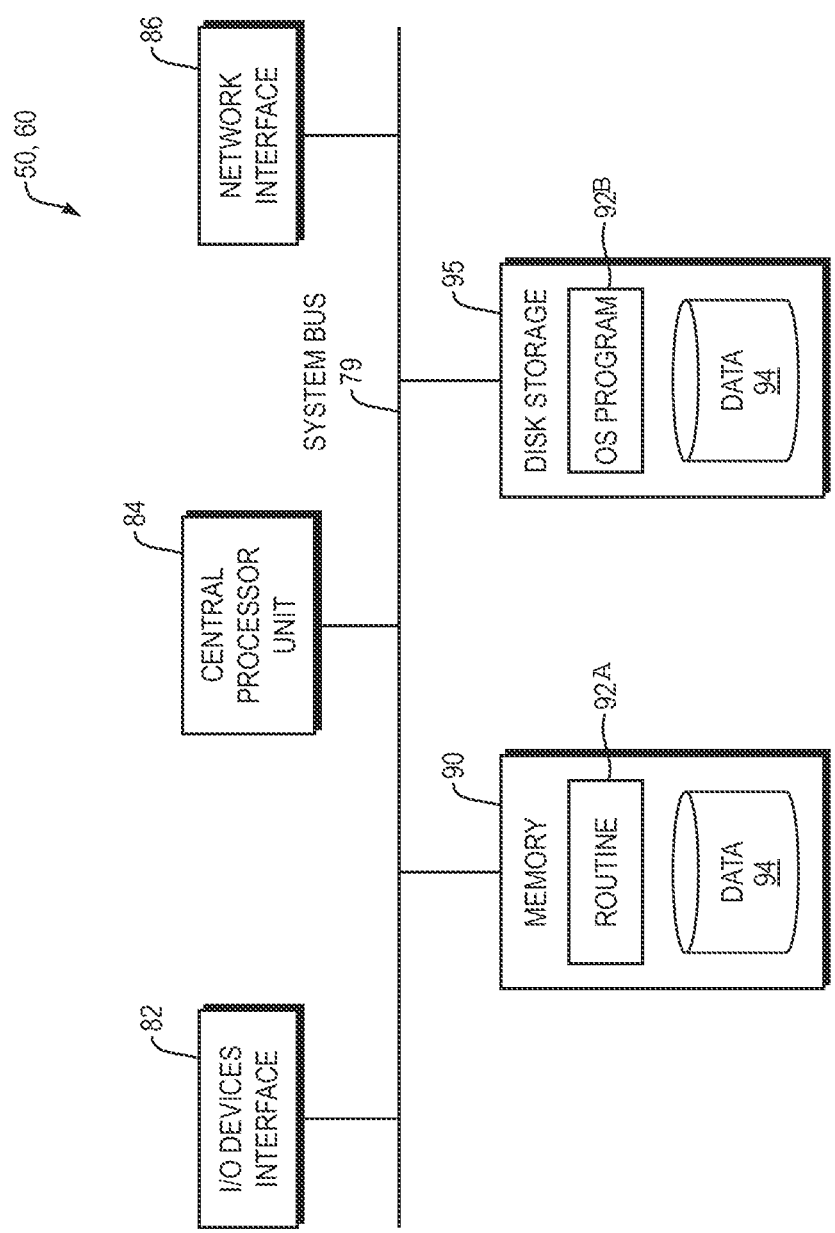
FIG. 7 is a diagram of an example internal structure of a computer (e.g., client processor/device or server computers) in the computer system of FIG. 6.

FIG. 7 is a diagram of an example internal structure of a computer (e.g., client processor/device 50 or server computers 60) in the computer system of FIG. 6. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present invention (e.g., recommendation engine, mood database, content database, user reactions to content database, user interface, application programming interface code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

In embodiments, the computer programs and methods described herein can employ machine learning, including using generative models having encoder neural networks and decoder neural networks. As used herein the "encoder neural network" (also referred to as encoder in the following) and the "decoder neural network" (also referred to as decoder in the following) may generally refer to one or more functional and/or structural components parts, sections, stages or modules of the generative model (also referred to as generative network in the following).

The encoder neural network may, for example, be configured to process an input, such as a sampling input, into an intermediate output. The encoder neural network may further be configured to provide and/or pass the intermediate output to the decoder neural network. The decoder neural network may be configured to reconstruct the input based on processing the intermediate output provided by the encoder neural network.

In an example, the encoder neural network may be configured to map a sampling input to a latent vector. Alternatively or additionally, the decoder neural network may be configured to estimate, reconstruct and/or compute the sampling input from the latent vector to produce an output.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method comprising:
providing a model trained on data representing a plurality of different reactions to a plurality of units of content, each reaction being by one or more respective users of a plurality of users, such that the model trained provides a prediction of a reaction evoked for a user;
receiving a reaction to a first unit of content presented in a user interface from a first user, the reaction received via the user interface, the first unit of content selected by a recommendation engine using the model, wherein the reaction is received responsive to user-selection of at least one of a user-selected icon and a user-selected string;
receiving a desired display level of the reaction from the first user via the user interface, the desired display level being an input to the recommendation engine that influences frequency with which the recommendation engine finds units of content predicted to elicit the reaction associated with the desired display level;
updating the model by:
associating in memory (i) the reaction received and (ii) the first unit of content, and
associating in the memory (i) the reaction received and (ii) the desired display level of the reaction from the first user;
receiving an indication of an explicitly desired mood, wherein the indication includes: (i) a vector indicating the explicitly desired mood, where the vector is composed of each reaction of the plurality of different reactions with a respective numerical indicator of desired display level for each reaction of the plurality of different reactions and (ii) at least one rule indicating a condition for enacting the explicitly desired mood;
responsive to the condition being met, determining, at the recommendation engine, a second unit of content based on the model and the received indication of the explicitly desired mood, the recommendation engine thereby weighting the reaction and the desired display level of the reaction to the first unit of content in determining the second unit of content predicted to elicit the reaction associated with the desired display level; and
presenting the second unit of content determined by the recommendation engine in the user interface.

2. The computer-implemented method of claim 1, further comprising receiving the desired display level of the reaction during a same user interaction as receiving the reaction.

3. The computer-implemented method of claim 1, further comprising uploading a custom icon by an uploading user.

4. The computer-implemented method of claim 1, further comprising associating the plurality of different reactions to respective units of content and associating the first user with a plurality of desired display levels of the reaction.

5. The computer-implemented method of claim 4, further comprising:
correlating the plurality of different reactions from at least one of the first user and a plurality of users to the respective units of content to generate a probability that each content elicits a given reaction by other users.

6. The computer-implemented method of claim 1, wherein the explicitly desired mood can be at least one of:
chosen by the first user;

selected based on a window of time; and
selected based on recency of being chosen by the first user.

7. The computer-implemented method of claim 1, further comprising:
loading a plurality of reactions received from other users to the first unit of content;
normalizing the reaction of the first user to the plurality of reactions from the other users by generating a normalized reaction vector; and
determining the second unit of content by comparing the normalized reaction vector to a database of content, and selecting a unit of content from the database having a reaction vector most similar to the normalized reaction vector.

8. The computer-implemented method of claim 7, wherein a user can be associated with a plurality of moods, and further comprising:
normalizing the reaction of the first user to the plurality of reactions from the other users by generating a plurality of normalized reaction vectors corresponding to each mood.

9. The computer-implemented method of claim 1, wherein the model of the recommendation engine selects the first unit of content by at least one of:
determining content that fits a profile of a user,
determining content that fits a generic user profile,
determining content that fits a generic demographic user profile; and
determining content at random.

10. The computer-implemented method of claim 1, wherein the recommendation engine determines the second unit of content based on reactions of other users.

11. The computer-implemented method of claim 1, further comprising:
displaying the second unit of content in at least one of the user interface and a second user interface.

12. A system comprising:
a processor; and
a memory with computer code instructions stored thereon, the processor and the memory, with the computer code instructions, being configured to cause the system to:
provide a model trained on data representing a plurality of different reactions to a plurality of units of content, each reaction being by one or more respective users of a plurality of users, such that the model trained provides a prediction of a reaction evoked for a user;
receive a reaction to a first unit of content presented in a user interface from a first user, the reaction received via the user interface, the first unit of content selected by a recommendation engine using the model, wherein the reaction is received responsive to user-selection of at least one of a user-selected icon and a user-selected string;
receive a desired display level of the reaction from the first user via the user interface, the desired display level being an input to the recommendation engine that influences frequency with which the recommendation engine finds units of content predicted to elicit the reaction associated with the desired display level;
update the model by:
associating in storage memory (i) the reaction received and (ii) the first unit of content, and
associating in the storage memory (i) the reaction received and (ii) the desired display level of the reaction from the first user;
receive an indication of an explicitly desired mood, wherein the indication includes: (i) a vector indicating the explicitly desired mood, where the vector is composed of each reaction of the plurality of different reactions with a respective numerical indicator of desired display level for each reaction of the plurality of different reactions and (ii) at least one rule indicating a condition for enacting the explicitly desired mood;
responsive to the condition being met, determine, at the recommendation engine, a second unit of content based on the model and the received indication of the explicitly desired mood, the recommendation engine thereby weighting the reaction and the desired display level of the reaction to the first unit of content in determining the second unit of content predicted to elicit the reaction associated with the desired display level; and
present the second unit of content determined by the recommendation engine in the user interface.

13. The system of claim 12, wherein the processor is further configured to receive the desired display level of the reaction during a same user interaction as receiving the reaction.

14. The system of claim 12, wherein the processor is further configured to upload a custom icon by an uploading user.

15. The system of claim 12, wherein the processor is further configured to associate the plurality of different reactions to respective units of content and associate the first user with a plurality of desired display levels of the reaction.

16. The system of claim 15, wherein the processor is further configured to correlate the plurality of different reactions from at least one of the first user and a plurality of users to the respective units of content to generate a probability that each content elicits a given reaction by other users.

17. The system of claim 12, wherein the explicitly desired mood can be at least one of:
chosen by the first user;
selected based on a window of time; and
selected based on recency of being chosen by the first user.

18. The system of claim 12, wherein the processor is further configured to:
load a plurality of reactions received from other users to the first unit of content;
normalize the reaction of the first user to the plurality of reactions from the other users by generating a normalized reaction vector; and
determine the second unit of content by comparing the normalized reaction vector to a database of content, and selecting a unit of content from the database having a reaction vector most similar to the normalized reaction vector.

* * * * *